March 22, 1966  F. E. BUSCHBOM  3,241,657
JOINTED FEED CONVEYOR
Filed March 13, 1964  2 Sheets-Sheet 1
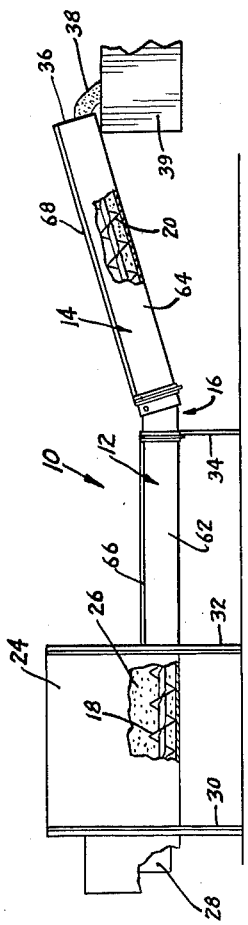
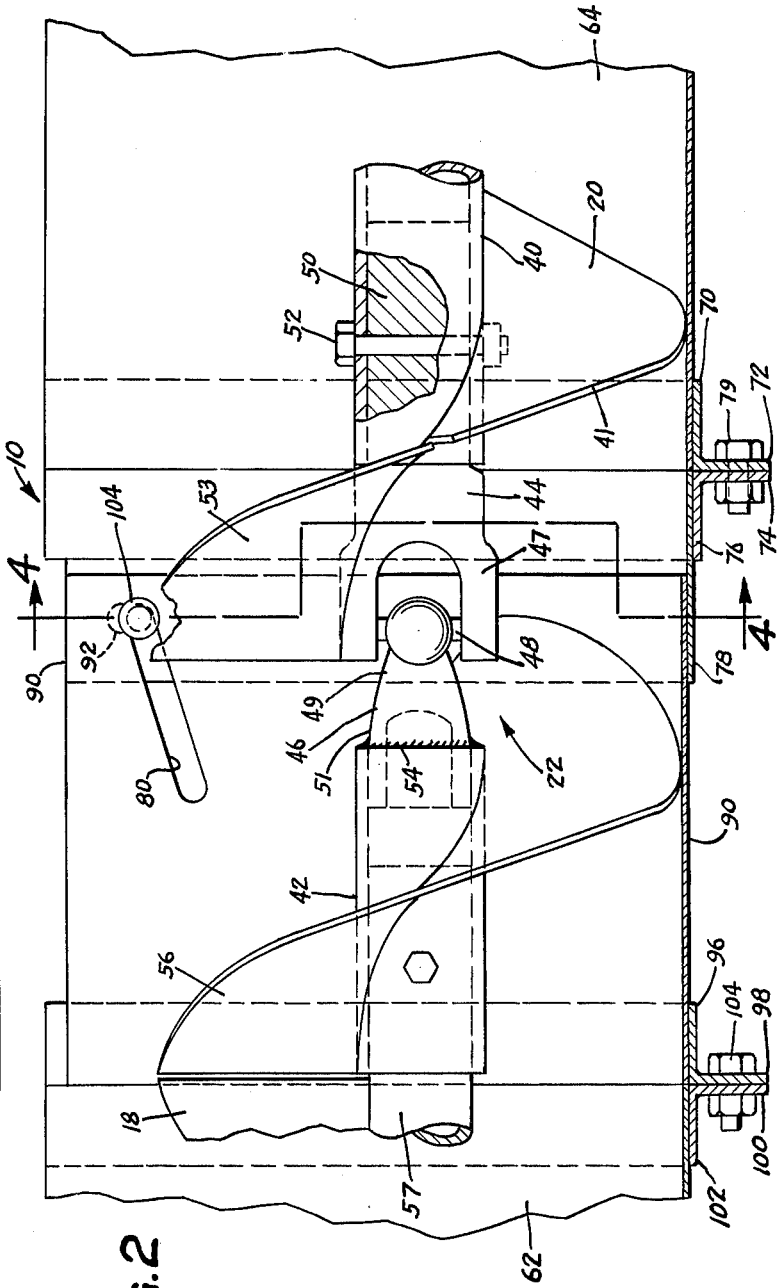
INVENTOR.
FLOYD E. BUSCHBOM
BY Moore, White & Burd
ATTORNEYS March 22, 1966  F. E. BUSCHBOM  3,241,657
JOINTED FEED CONVEYOR Filed March 13, 1964  2 Sheets-Sheet 2

INVENTOR.
FLOYD E. BUSCHBOM
BY Moore, White & Burd
ATTORNEYS

United States Patent Office 3,241,657
Patented Mar. 22, 1966

3,241,657
JOINTED FEED CONVEYOR
Floyd E. Buschbom, Rte. 1, Long Lake, Minn.
Filed Mar. 13, 1964, Ser. No. 351,699
11 Claims. (Cl. 198—213)

The present invention relates to materials handling and more particularly to screw conveyors and to a flexible joint construction for such conveyors. While the invention has general application, it is particularly useful in connection with an auger conveyor of the type used for transporting forage or ensilage to a livestock feed bunk.

Most prior auger conveyors are unsuited for conveying material from one elevation to another as for example from a hopper at a relatively low elevation to the top of a wagon or at a later time to a feed bunk or other container at a much lower elevation. In order to accomplish this objective, a conveyor must reliably transport material from one end to the other but at the same time the outlet end of the conveyor must be easy to move from one elevation to another.

The apparatus of the present invention includes two conveyor sections which are connected by a joint adapted to permit relative pivotal movement between the conveyor sections about a horizontal axis. To be practical, the joint employed in the conveyor of the present invention must allow material to be transported through the conveyor without loss as might occur, for example, if the material were able to fall through an opening at the pivotal connection between the conveyor sections. The joint must also produce no tendency for the material being conveyed to become packed at the intersection of the two auger sections. The conveyor must, in addition, be relatively simple in construction and durable. Thus, one feature of the invention is the provision of a jointed bunk feeder conveyor including a pair of universally connected augers and a trough surrounding a portion of each of the augers and a pivotal connection between the trough sections. Another feature of the invention is the provision of a pair of universally connected auger sections each enclosed at least partially by a trough-like housing one of which fits telescopically within the other at a point adjacent the universal connection between the auger sections.

A still further feature of the invention is the provision of a pair of housing sections composed of telescopically related troughs and including a fastener between the trough sections for regulating the radial displacement between the troughs so that a predetermined spacing is maintained between their adjacent edges at any selected angle of intersection between the conveyor sections. Specifically, guides are provided to maintain the lower edges of the adjacent trough sections in close proximity as the angle between the sections is changed.

It is thus a general object of the present invention to provide an improved auger joint construction which is rugged in construction, reliable in operation and can be manufactured at a relatively low cost.

Another object of the invention is the provision of an improved jointed conveyor including a pair of pivotally related troughs and a means for holding portions of the adjacent trough sections in close proximity with one another as the angle between the trough sections is varied.

A further object of the invention is the provision of an improved bunk feed conveyor including a pair of universally connected auger sections, a pair of trough sections each with a generally U-shaped cross-sectional configuration positioned below the auger sections and secured together in overlapping relationship adjacent the universal connection between the auger sections by the provision of a guide means on each side of the trough for securing together the overlapping edges of the adjacent trough sections so as to hold the overlapping bottoms of the trough sections in engagement as one trough section is pivoted relative to the other.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 1 is a side elevational view partly broken away of a conveyor embodying the present invention;

FIGURE 2 is an enlarged partial longitudinal sectional view of the conveyor taken through the joint in accordance with the present invention;

Figure 3:
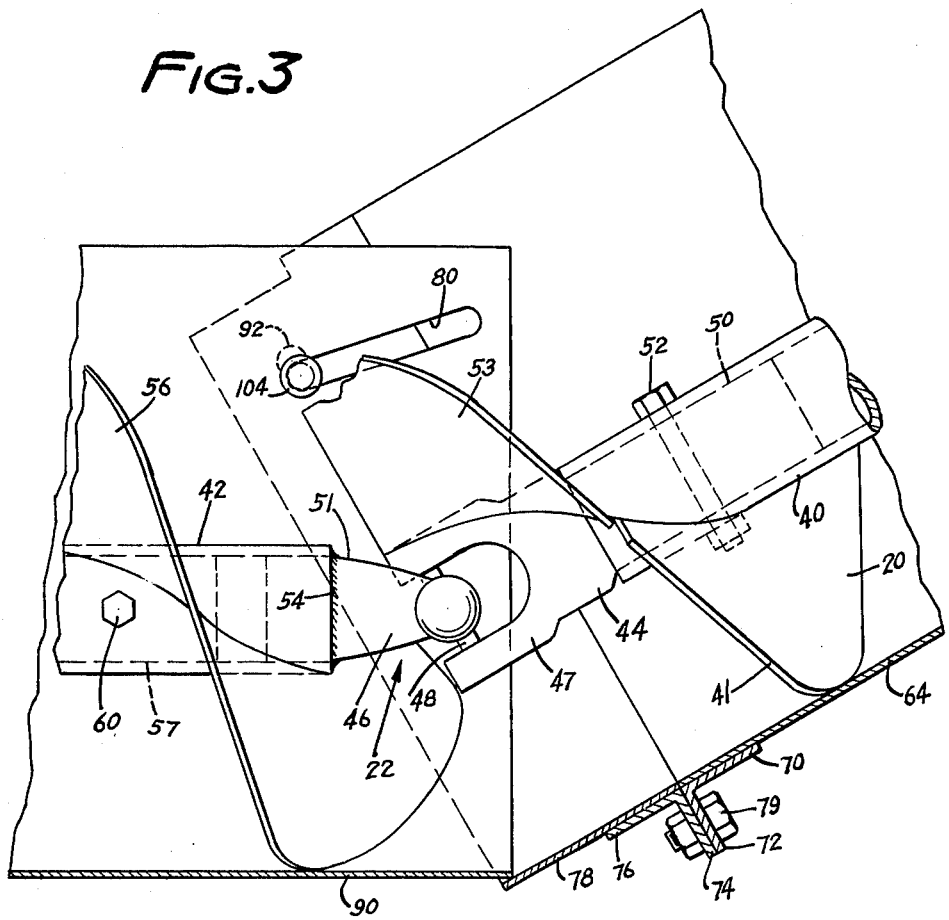
FIGURE 3 is a partial longitudinal sectional view similar to FIGURE 2 but illustrating the joint when the conveyor sections intersect at an oblique angle.

Refer now to the accompanying drawings wherein the same numerals refer to the same parts in the several views. As can be seen in FIGURE 1, the invention provides a bunk feeder conveyor indicated generally at 10 and including two conveyor sections 12 and 14 which are pivotally related for relative angular displacement about a horizontally disposed axis at a joint 16. The conveyor 10 includes a flighted auger section 18 and a flighted auger section 20 which are both mounted for rotation and secured together by means of a universal joint 22 best seen in FIGURES 2 and 3.

The left end of the auger conveyor 18 as seen in FIGURE 1, projects into a hopper 24 which is adapted to contain the feed material such as ensilage 26, which is to be conveyed. A portion of the conveyor 18 projects outwardly through the end of the hopper 24 and is connected to a suitable drive means such as a motor speed reducer assembly 28 of any suitable and well-known construction.

As can also be seen in FIGURE 1, hopper 24 and conveyor section 12 are shown supported by means of spaced and vertically disposed legs 30, 32 and 34 of any suitable type.

As shown in FIGURE 1, the section 12 of the conveyor 10 is disposed in a horizontal plane while the section 14 is disposed at an oblique angle with respect to the section 12. The free end 36 of the section 14 is open so that material which is conveyed thereto is expelled at 38 into a feed bunk or other receptacle 39.

As can be best seen in FIGURES 2 and 3, the auger sections 18 and 20 include sleeves or auger tubes 40 and 42 respectively having end pieces 44 and 46 respectively secured thereto. Suitably secured as by welding to the auger tube 40 is the helical auger flight of auger section 20 of a suitable known construction.

The end piece 44 comprises a rod 50 telescopically mounted within the tubular sleeve 40 and secured thereto by means of a suitable fastener such as nut and bolt 52. Rigidly connected to the rod 50 is a relatively short auger flight section 53 the right end of which as seen in FIGURES 2 and 3 is positioned in alignment with the free end of the flight of auger 20. The end piece 44 includes a terminal portion having a generally U-shaped forked end 47 to which a cross 48 is pivotally secured. The cross 48 is also pivotally secured to a U-shaped fork 49 of the end piece 51 which is rigidly secured as by welding 54 within the right end of the tubular sleeve 42. Secured to the sleeve 42 is a helical flight 56 which extends from the end of flight 18 toward the right in FIGURES 2 and 3 to a position laterally of the cross 48. The end 57 of auger 18 is held within the sleeve 42 by means of a suitable fastener such as a nut and bolt assembly 60.

Figure 4:
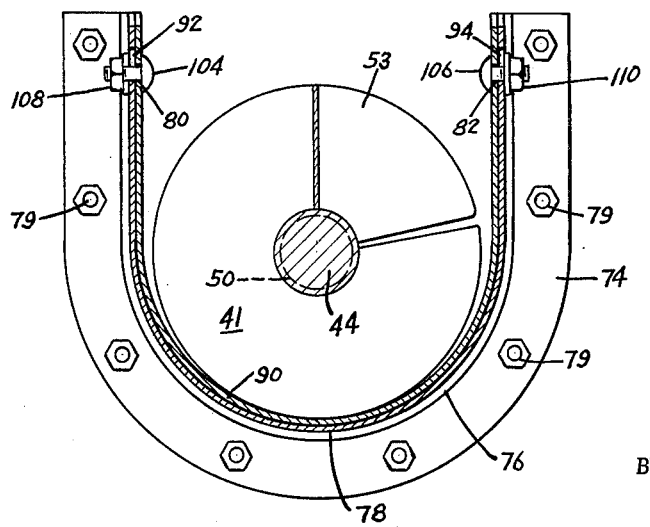
FIGURE 4 is a transverse sectional view taken on line 4—4 of FIGURE 2.

As can be best seen in FIGURES 1 and 4, the conveyor sections 12 and 14 also include generally U-shaped enclosures or troughs 62 and 64 formed from sheet metal which have secured to the upward ends longitudinally extending and laterally spaced angle irons or other reinforcing means 66 and 68 respectively. At the end of the troughs 62 and 64 adjacent the joint 16 are provided extensions 78 and 90 to be described in detail below.

The extension 78 is secured to the trough 64 by means of a generally U-shaped angle iron 70 including a radially extending flange 72 which is affixed as by welding to the trough 64. Another U-shaped angle iron 76 having a radially extending flange 74 is secured to angle iron 70 by means of suitable fasteners such as bolts 79. Rigidly secured as by welding to the angle iron 76 is the relatively short connecting trough section 78. Section 78 can be formed from sheet metal and having a U-shaped cross-section as best seen in FIGURE 4. The upward or free end of each of the side walls of the connecting trough section 78 are a pair of parallel and aligned guides such as slots 92 and 94 which are positioned vertically.

Telescopically mounted within the left end of the connecting trough section 78 as seen in FIGURE 2, is the connecting trough section 90. The connecting trough assembly 90 is also U-shaped in cross-section and includes a pair of guides such as vertically elongated and aligned slots 80 and 82 at the free ends thereof which are inclined downwardly proceeding away from the free end of trough section 90. The length of the slots 92 and 94 is relatively short compared with the slots 80 and 82. To the left end of trough 90 is secured a connecting member such as a U-shaped angle iron 96 having a radially extending flange 98 to which is fastened a flange 100 of a similar angle iron 102, itself rigidly affixed as by welding to the trough section 62. Angle irons 96 and 102 are fastened together by means of bolts 104.

Extending through the openings 92 and 82 and through the openings 80 and 94, respectively, are pairs of fasteners such as bolts 104 and 106 having nuts 108 and 110 secured to their outward ends. The slots 92 and 94 allow a limited vertical movement of the bolts 104 and 106 relative to the section 78. When it is desired to change the angular relationship between the trough sections 12 and 14, the nuts 108 and 110 and bolts 104 and 106 are loosened, and the bolts slide in either direction within the guides 82 and 80 until the proper angle is established between the trough sections. The position of the bottom of the section 78 is adjusted with repect to section 90 such that its free edge does not extend beyond the free edge of the section 90. The bolts can then be retightened.

It should be carefully noted that the curved portions of the adjacent telescopically related trough sections will remain in close proximity regardless of the angle of intersection between the trough sections 12 and 14 by virtue of the cooperative interaction between the guides 80 and 82 and the fasteners 104 and 106. It should also be noted that the relatively short rod 50 corresponds in position with the short trough section 78 and the longer section 51 corresponds in position with trough section 90.

The number of units embodying the present invention have been manufactured and placed in use under actual service conditions. They proved to be reliable in operation and rugged in constrution. Moreover, there was little tendency for material to become packed around the joint 16 or for material to become lost by falling through an opening between the sections 78 and 90.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A joint construction for auger type conveyor comprising in combination a pair of elongated conveyor sections, each of said conveyor sections including a flighted auger and an enclosure at least partially surrounding each auger, pivotal connections disposed on opposite sides of the enclosures for connecting adjacent ends of the enclosures and permitting swinging movement between said enclosures, and unsupported universal joint means secured to adjacent ends of the flighted augers.

2. A joint construction defined in claim 1 further characterized by the adjacent end sections of the enclosures telescopically positioned relative to each other at a point adjacent the universal joint means.

3. A joint construction for an auger conveyor comprising in combination a pair of elongated conveyor sections, each of the sections including an auger and an enclosure at least partially surrounding each auger, a pivotal connection secured between each enclosure, a universal joint secured between each auger, said enclosures having adjacent end portions positioned in overlapping relationship with one end portion telescopically mounted within the other end portion at a point adjacent the universal joint, guide means between the telescopically related portions of the enclosures for regulating the radial displacement between the portions when the portions are pivoted relative to each other.

4. A bunk feeder conveyor comprising in combination a pair of elongated trough-shaped housings, a first and second flighted auger conveyor mounted within each respective housing, universal joint means connecting adjacent ends of each of the auger conveyors, a telescopic connection between said pair of trough-shaped housings, guide means including pivot means connecting adjacent end sections of the trough-shaped housings for holding the lower adjacent portions of each housing together in close proximity when the trough-shaped housings are pivoted relative to one another.

5. A bunk feeder conveyor comprising a combination an elongated trough-shaped housing, a first and second flighted auger conveyor mounted within said housing, a universal joint connecting adjacent ends of each of the auger conveyors, said trough-shaped housing being divided into a pair of pivotally related parts positioned in overlapping engagement at their adjacent ends, guide means operatively connected between the parts of the housing at their overlapping ends for holding them against radial displacement when the trough-shaped housings are pivoted relative to one another, said guide means comprising an inclined slot on each side of one of the housings adjacent the end thereof and a connecting member projecting through each slot and through an adjacent portion of the other of said housings, the guide means inclined toward the closed end of said one housing proceeding away from the overlapping parts.

6. A bunk feeder conveyor comprising in combination an elongated housing, a first and second auger conveyor mounted within said housing, a universal joint connecting adjacent ends of each of the auger conveyors, said housing being divided into a pair of pivotally related and telescopically disposed troughs, guide means operatively connected between the troughs for holding the lower portion of each trough in close proximity to the other trough when the housings are pivoted relative to one other, said troughs each having a rounded bottom and a pair of parallel vertically disposed side walls and each of said troughs being open at the top, one trough having a first pair of aligned slots, one slot of the pair being positioned on each of the side walls of said one trough adjacent the joint and each of the slots being inclined downwardly toward the rounded bottom of the same trough proceeding away from the joint, a pair of perforations in the other trough adjacent the end thereof and positioned in alignment with said slots and first fastener projecting through the slot on one side and the adjacent perforation and a second fastener projecting through the other slot and the other perforation.

7. A feed conveyor for a bunk feeder comprising a combination a hopper, a first auger section connected to the hopper, said first auger section having a generally U-shaped trough with a curved bottom and parallel side walls, said first trough section being open at the top thereof, an auger conveyor positioned within said first auger section, a drive means operatively connected to the auger conveyor, a second trough section connected to the end of the first trough section opposite the hopper, said second trough section having a generally U-shaped cross-section with a curved bottom and parallel side walls, and said second trough section being open at the top thereof, a second auger conveyor positioned within said second trough section, a universal joint connected between adjacent ends of the auger conveyors, a pivotal connection between adjacent portions of the first and second trough sections, said pivotal connection comprising means mounting one trough section within the other trough section with the side edges and curved bottom portions in close proximity and guide means operatively connected near the adjacent ends of the side walls of the first and second trough sections for holding the curved bottom edges of the troughs in abutting relationship as the sections are pivoted relative to one another.

8. An auger conveyor for a bunk feeder comprising in combination an inlet means, a first enclosure section connected to the inlet means, said first enclosure section having a curved bottom and parallel side walls, said first enclosure section being open at the top thereof, a flighted auger conveyor positioned within said first enclosure, a drive means operatively connected to the auger conveyor, a second enclosure section pivotally connected to the free end of the first enclosure section, said second enclosure having a curved bottom and parallel side walls, and said second enclosure section being open at the top thereof, a second flighted auger conveyor positioned within said second enclosure, a universal joint connected between adjacent ends of the auger conveyors, the end of one of the enclosures being positioned within the other of the enclosures with the side edges and curved bottom portions in abutting relationship, guide slots near the free ends of the side walls of one enclosure section, relatively short vertically disposed slots in the other enclosure adjacent the joint and in alignment with the guide slots and fasteners projecting through adjacent pairs of slots for holding the curved bottom edge of the enclosures in abutting relationship during pivotal movement of the enclosures relative to one another.

9. In an auger conveyor having an enclosure divided into two pivotally related parts, the improvement comprising an auger positioned in each enclosure, a universal joint having two pivotally related members connecting the augers in each enclosure, and a short section of auger flighting secured to and coextensive with each member of the universal joint.

10. In an auger conveyor having a first U-shaped housing, a second U-shaped housing positioned adjacent one end of the first U-shaped housing, means pivotally mounting said first housing to said second housing for movement about a substantially horizontal axis, an auger positioned in each housing, universal joint means having at least two pivotally related members drivably connecting adjacent ends of the augers located in the area adjacent the ends of the first and second housings, and a short section of auger flighting secured to and coextensive with at least one of the pivotally related members of the universal joint means.

11. In an auger type conveyor a joint construction comprising in combination a pair of elongated conveyor sections, each of said conveyor sections including a flighted auger and an enclosure at least partially surrounding each auger, pivotal connections disposed on opposite sides of the enclosures for connecting adjacent ends of the enclosures and permitting swinging movement between said enclosures, universal joint means having two pivotally related members drivably connecting adjacent ends of the augers, and a short section of auger flighting secured to and coextensive with at least one of said pivotally related members, the adjacent end sections of the enclosures telescopically positioned relative to each other at a point adjacent the universal joint means.

References Cited by the Examiner
UNITED STATES PATENTS 1,099,956  6/1914  Williams _____ 198—213

SAMUEL F. COLEMAN, *Primary Examiner.*

WILLIAM B. LABORDE, *Examiner.*